(12) United States Patent
Falgout

(10) Patent No.: US 10,440,967 B2
(45) Date of Patent: Oct. 15, 2019

(54) UPWARDLY ILLUMINATED INSPECTION STATION FOR DETECTING ANOMALIES IN WATER-BORNE PRODUCTS

(71) Applicant: Laitram, L.L.C., Harahan, LA (US)

(72) Inventor: Byron M. Falgout, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 236 days.

(21) Appl. No.: 15/686,430

(22) Filed: Aug. 25, 2017

(65) Prior Publication Data

US 2019/0059404 A1   Feb. 28, 2019

(51) Int. Cl.
| | |
|---|---|
| A22C 29/00 | (2006.01) |
| A22C 29/02 | (2006.01) |
| A23B 4/26 | (2006.01) |
| A23L 3/00 | (2006.01) |

(52) U.S. Cl.
CPC .......... *A22C 29/023* (2013.01); *A22C 29/005* (2013.01); *A23B 4/26* (2013.01); *A23L 3/001* (2013.01); *A22C 29/022* (2013.01); *A23V 2002/00* (2013.01)

(58) Field of Classification Search
CPC ............................. A22C 29/00; A22C 29/005
USPC ...................................................... 452/1–12
See application file for complete search history.

(56) References Cited

U.S. PATENT DOCUMENTS

| | | | | |
|---|---|---|---|---|
| 5,059,151 A | * | 10/1991 | Kiczek ................. | A22C 29/046 452/13 |
| 6,554,691 B1 | * | 4/2003 | Schauls ................. | A22C 25/06 452/194 |
| 6,855,049 B2 | * | 2/2005 | Richardson ........... | A22C 25/06 452/192 |
| 8,991,098 B2 | * | 3/2015 | Lejeune ................. | A01H 1/04 47/65 |
| 9,387,482 B2 | * | 7/2016 | Goodrich ............... | B03B 5/26 |
| 2014/0168411 A1 | | 6/2014 | Ledet et al. | |

FOREIGN PATENT DOCUMENTS

| | | |
|---|---|---|
| JP | 4030849 B2 | 1/2008 |
| KR | 200263837 Y1 | 2/2002 |
| KR | 101172040 B1 | 8/2012 |
| KR | 101584527 B1 | 1/2016 |

OTHER PUBLICATIONS

International Search Report and Written Opinion of the International Searching Authority, PCT/US2018/043868, dated Mar. 13, 2019, Korean Intellectual Property Office, Republic of Korea.

* cited by examiner

*Primary Examiner* — Richard T Price, Jr.
(74) *Attorney, Agent, or Firm* — James T. Cronvich

(57) ABSTRACT

An inspection station and a method of inspecting products for anomalies. The inspection station comprises a trough and a light source. The trough channels a flow of product-laden water along its length. The light source illuminates the product through the water from below, making product anomalies detectable by visual inspection. In that way, products with anomalies, such as shrimp with residual veins, can be culled and reprocessed.

19 Claims, 2 Drawing Sheets

UPWARDLY ILLUMINATED INSPECTION STATION FOR DETECTING ANOMALIES IN WATER-BORNE PRODUCTS

BACKGROUND

The invention relates generally to apparatus and methods for inspecting products for anomalies. In particular, it relates to the visual inspection of illuminated products, such as shrimp, carried in a flow of water.

Many conveyor lines include inspection stations at which quality-control inspectors visually inspect passing products for unacceptable anomalies and remove or divert the unacceptable products. In the processing of shrimp, for instance, raw peeled and headless shrimp pass through a deveiner, which removes the veins to produce raw deveined shrimp. But occasionally some shrimp exit the deveiner with residual vein. And because the residual vein is thin and can be hidden by the shrimp body, it is often difficult for an inspector to detect.

SUMMARY

One version of an inspection station embodying features of the invention comprises a trough channeling a flow of water carrying products along the length of the trough between side walls and a light source upwardly illuminating the products through the bottom of the trough and the water to make anomalies in the products detectable by visual inspection.

Another version of an inspection station especially for inspecting shrimp comprises a trough channeling a flow of water carrying raw deveined shrimp along the length of the trough between sidewalls and a light source upwardly illuminating the shrimp through the bottom of the trough and the water to make residual veins detectable by visual inspection.

In another aspect, a method of inspecting products for anomalies and embodying features of the invention comprises: (a) flowing products in a flow of water along the length of a trough; (b) illuminating the products through the water from below; (c) visually inspecting the illuminated products flowing along the trough for anomalies; and (d) culling products with anomalies from the trough.

DETAILED DESCRIPTION

Figure 1:
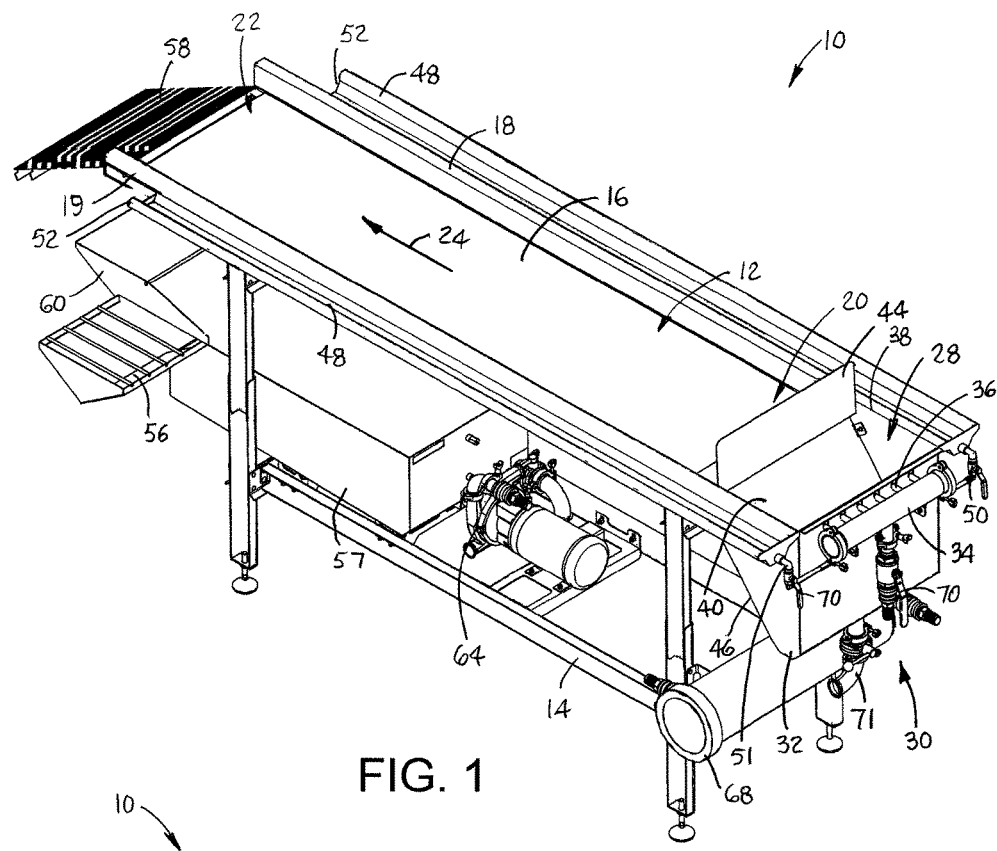
FIG. 1 is an isometric view of an inspection station embodying features of the invention.
Figure 2:
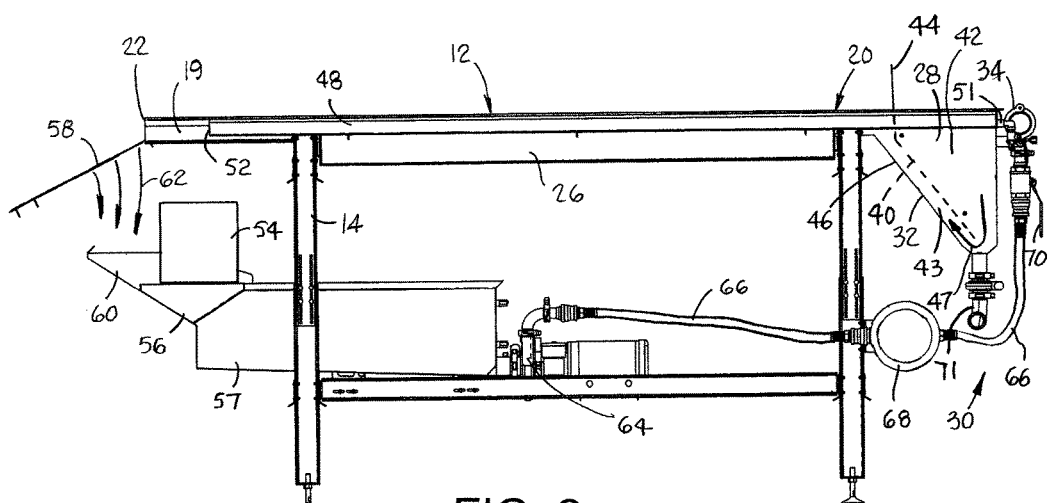
FIG. 2 is a side elevation view of the inspection station of FIG. 1.

FIGS. 1 and 2 depict an inspection station embodying features of the invention. The inspection station 10 comprises a trough 12 supported in a frame 14. The trough 12 has a bottom 16 and a pair of opposite side walls 18, 19 that extend in length from a trough entrance 20 to an exit 22. The trough 12 channels a flow of water carrying products in a flow direction 24 from the entrance 20 to the exit 22. The bottom 16 of the trough 12 is formed by a transparent or translucent sheet sitting atop a light table 26. The light table 26 serves as a light source directing diffuse light upward through the bottom sheet 16 and into the trough 12. The diffuse light uniformly illuminates the products flowing along the length of the trough 12. The light table 26 may be a single table or a series of light-table sections as needed to illuminate the trough 12 along its length and width.

A feed 28 introduces products in a flow of water into the trough 12 at the entrance 20. The feed 28 includes a water source 30 and a feed tank 32. The water source 30 includes a manifold 34 with outlets 36 injecting water into the tank 32. The tank 32 has an open top 38 and a divider 40 that extends downward into the tank. The divider 40 separates the tank 32 into an input portion 42 and an output portion 43. The two portions 42, 43 are in fluid communication below the lower end of the divider 40. Products are dumped into the input portion 42 of the tank 32 through the open top 38. A shield 44 at the upper end of the divider 40 prevents products from being dumped into the output portion 43 of the tank 32 or the trough 12. The divider 40, which is angled parallel to the trough-side wall 46 of the tank 32, shapes the input portion 43 as a narrow channel. The product-laden water is pushed downward in the input portion 42 by the water injected by the outlets 36, around the lower end of the divider 40, and upward through the narrow output portion 43, as indicated by arrow 47 in FIG. 2. The product-laden water flows from the output portion 43 of the tank 32 into the trough 12 at its entrance 20.

The water source 30 is adjusted to flow the water along the trough 12 in the flow direction 24 at a pace slow enough for a thorough inspection. The upwardly directed light from the light table 26 illuminates the products through the water flow and improves the detectability of anomalies in the products, such as residual shell, skin, or other unwanted appendages or organs, product discoloration, and foreign-matter contaminants. The inspectors cull anomalous products from the flow and deposit them in collectors 48 on the outer side of each side wall 18, 19. The inspectors also remove anomalous contaminants and deposit them in the collectors 48 or discard them separately. The collectors 48 shown are flumes supplied with water through pipes 50, 51 connected to the manifold 34. The water carries the culled products along the collectors 48 and out open ends 52 downstream into collection receptacles 54 (FIG. 2), such as baskets with bottom openings to let the water drain through to supporting gutters 56. The cull in the basket 54 can then be discarded, reprocessed, or used for a different purpose. The gutters 56 channel drain water collected from the flumes 48 to a reservoir 57, which also stores water that exits the trough 12.

The water-borne products exit the trough 12 onto a dewatering surface 58 with openings, such as a conveyor belt with open area or a slotted flat conveyor chute for drainage. As the products advance away from the trough 12 on the dewatering surface 58, the water drains through to a slide 60, as indicated by arrows 62. The slide 60 guides water into the reservoir 57. The water collected in the reservoir 57 from the slide 60 and the gutters 56 is recirculated back to the manifold 34. A pump 64 pumps water from the reservoir 57 through hosing 66. An optional water filter 68 may be interposed between the reservoir 57 and the manifold 34. Valves 70 throughout the water system are used to adjust the flow of water to the trough 12 and the flumes 48. A drain 71 with valve at the bottom of the tank 32 is used to empty the tank when off-line.

Figure 3:
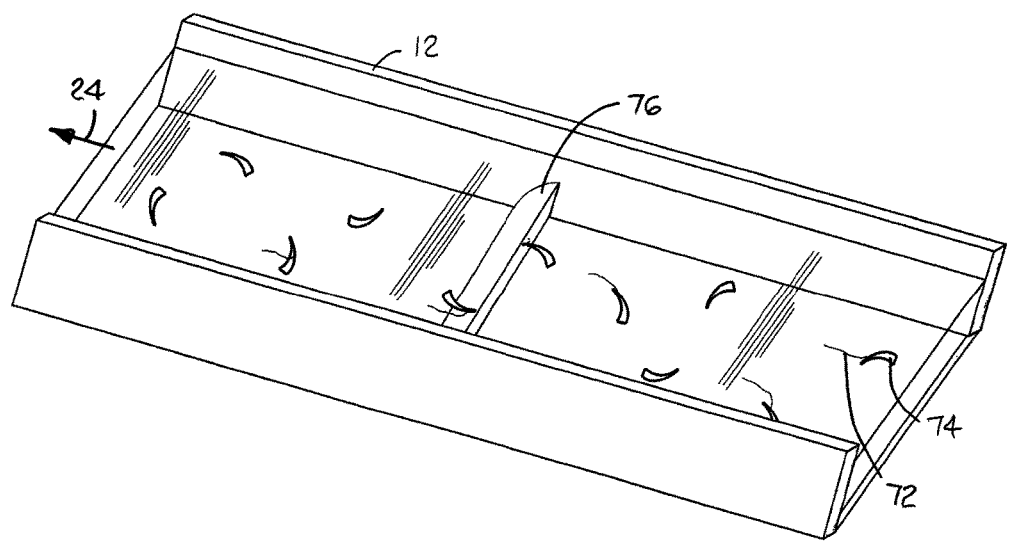
FIG. 3 is an axonometric view of a portion of the inspection station of FIG. 1 used to inspect shrimp for residual vein.
Figure 4:
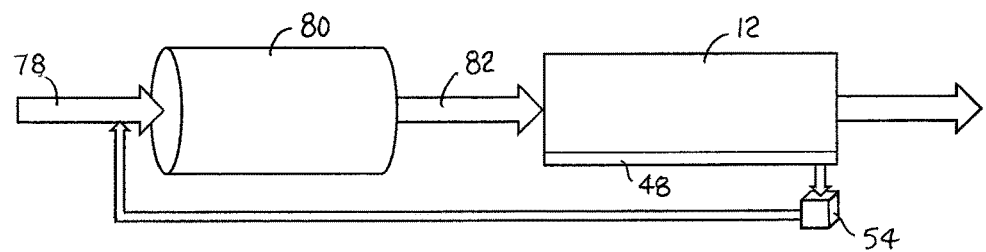
FIG. 4 is a block diagram of the inspection station of FIG. 1 used in a shrimp-deveining process.

FIGS. 3 and 4 illustrate the operation of the inspection station to inspect raw headless, shell-off, deveined shrimp for residual veins. As the water flows slowly through the trough 12 in the flow direction 24, the visibility of residual veins 72 in shrimp 74 is enhanced by the upwardly directed light from the light table. The water flow also tends to cause the lightweight veins 72 to trail out from the shrimp bodies 74, which further aids visibility. Obstructions 76 may be inserted in the trough 12 at spaced apart positions along its length to disrupt the flow of water, which causes the shrimp to tumble as they contact or pass by the obstructions. The tumbling causes the shrimp bodies 74 to reposition themselves so that veins 72 hidden by the shrimp bodies might be revealed. Because the buoyancy of the shrimp bodies 74 is close to that of the water, they ride throughout the depth of the water column of the flow, neither all sinking to the bottom nor all floating to the surface.

The inspection system of FIGS. 1-3 is shown as part of a shrimp-deveining process in FIG. 4. Raw, peeled shrimp 78 are fed into a deveiner 80, such as a tumble-drum deveiner, to remove the veins. The raw deveined shrimp 82 are then fed into the trough 12 as described with respect to FIGS. 1 and 2. The shrimp are flowed in a flow of water along the length of the trough 12 while being illuminated through the water by the light table below. Inspectors visually inspect the illuminated shrimp flowing along the trough 12 for residual veins. The inspectors cull shrimp with residual veins from the trough and deposit them in the collectors 48, which deliver them to the collection receptacles 54. The culled shrimp with residual veins collected in the receptacles 54 are returned to the deveiner 80 for reprocessing.

Although the invention has been described in detail with respect to the deveining of shrimp, it applies to other products as well. Some examples of other products and their anomalies whose detection can be enhanced are: (1) oyster or other mussel meats for residual shell, foreign matter, or discoloration; (2) crawfish tail meats or crab meat for residual shell, foreign matter, or discoloration; and (3) vegetables, such as peas, beans, and corn, for foreign matter or discoloration.

What is claimed is:

1. An inspection station comprising:
   a trough having a bottom and a pair of side walls extending in length from an entrance to an exit and channeling a flow of water carrying products along the length of the trough;
   a light source along the bottom of the trough upwardly illuminating the products through the water to make anomalies in the products detectable by visual inspection.

2. An inspection station as in claim 1 comprising a feed introducing the products in the flow of water into the trough through the entrance.

3. An inspection station as in claim 1 further comprising a collector along at least one of the side walls outside the trough for collecting products with anomalies culled from the trough.

4. An inspection station as in claim 1 further comprising at least one obstruction extending transversely across the flow of water between the pair of side walls to disrupt the flow of water and cause products to tumble as they contact or pass the obstruction.

5. An inspection station as in claim 1 comprising a dewatering surface at the exit of the trough receiving the products exiting the trough and having openings that allow water to drain through the dewatering surface.

6. An inspection station as in claim 5 wherein the dewatering surface is provided on a conveyor belt or a flat conveyor chute.

7. An inspection station as in claim 5 comprising a feed introducing the products in the flow of water into the trough through the entrance, a reservoir collecting the water draining through the dewatering surface, and a pump directing the water from the reservoir to the feed.

8. An inspection station as in claim 7 further comprising a filter between the pump and the feed to filter the water before it returns to the feed.

9. An inspection station as in claim 1 wherein the light source comprises a light table providing diffuse light upward through the bottom of the trough.

10. An inspection station as in claim 9 wherein the light table comprises a series of light-table sections.

11. An inspection station as in claim 9 comprising a transparent or translucent sheet atop the light table along the bottom of the trough.

12. An inspection station comprising:
    a trough having a bottom and a pair of side walls extending in length from an entrance to an exit and channeling a flow of water carrying raw deveined shrimp along the length of the trough;
    a light source along the bottom of the trough upwardly illuminating the shrimp through the water to make residual veins detectable by visual inspection.

13. An inspection station as in claim 12 comprising a feed introducing the raw deveined shrimp in the flow of water into the trough through the entrance, wherein the feed includes:
    a water source;
    a tank including:
        an open top;
        a divider extending downward from the open top to a lower end and separating the tank into an input portion into which the water source injects water and the raw deveined shrimp are introduced and an output portion in fluid communication with the input portion below the lower end of the divider to form a shrimp-laden flow of water to the trough through the entrance.

14. An inspection station as in claim 12 further comprising a collector along at least one of the side walls outside the trough for collecting shrimp with residual veins culled from the trough to be deveined again.

15. An inspection station as in claim 14 further comprising a collection receptacle and wherein the collector is a flume conveying the shrimp with residual veins to the collection receptacle to be deveined again.

16. A method of inspecting products for anomalies comprising:
    flowing products in a flow of water along the length of a trough;
    illuminating the products through the water from below;
    visually inspecting the illuminated products flowing along the trough for anomalies;
    culling products with anomalies from the trough.

17. The method of claim 16 further comprising disrupting the flow of water along the trough to tumble the products in the flow.

18. The method of claim 16 wherein the products are shrimp and the anomalies are residual vein.

19. The method of claim 18 further comprising collecting the shrimp culled from the trough and deveining those shrimp again.

* * * * *